United States Patent [19]

Sarpeshkar et al.

[11] Patent Number: 5,079,327

[45] Date of Patent: * Jan. 7, 1992

[54] POLYURETHANE ELASTOMERS

[75] Inventors: Ashok M. Sarpeshkar, New Martinsville; Charles S. Gracik, McMechen, both of W. Va.

[73] Assignee: Mobay Corporation, Pittsburgh, Pa.

[*] Notice: The portion of the term of this patent subsequent to May 7, 2008 has been disclaimed.

[21] Appl. No.: 478,117

[22] Filed: Feb. 9, 1990

[51] Int. Cl.$^5$ .............................................. C08G 18/10
[52] U.S. Cl. ......................................... 528/59; 528/44;
528/53; 528/55; 524/424; 521/158; 428/213
[58] Field of Search ...................... 528/76, 75, 60, 59,
528/44, 55, 53; 521/158, 159; 524/424; 428/213

[56] References Cited

U.S. PATENT DOCUMENTS 4,722,946  2/1988  Hostettler ............................ 528/76
5,013,810  5/1991  Sarpeshkar et al. ................. 528/59

Primary Examiner—John Kight, III
Assistant Examiner—Duc Truong
Attorney, Agent, or Firm—Joseph C. Gil; Richard E. L. Henderson

[57] ABSTRACT

The present invention is directed to a solid polyurethane composition having a glass transition temperature of from $-20°$ C. to $0°$ C., having a Bayshore rebound of less than 20, and having a Shore A hardness of less than 80, and being prepared by reacting:
  a) a polyisocyanate having an isocyanate group functionality of 3 or more, and an isocyanate group content of from 15 to 25% by weight, with
  b) one or more diols having molecular weights of from 150 to about 650, wherein the isocyanate to hydroxyl equivalent ratio is from 0.95:1 to 1.2:1, and the weight ratio of component a) to component b) is from 5:1 to 1:1.5.

4 Claims, No Drawings

POLYURETHANE ELASTOMERS

BACKGROUND OF THE INVENTION

Low resiliency elastomers with good impact and shock absorption are potential candidates for shoe insoles, gloves, damping pads, vibration dampers, shock absorber pads or any other application where a soft elastomer with these properties is required. The use of polyurethane elastomers as such energy absorbing media is known. See, e.g., U.S. Pat. Nos. 4,346,205, 4,476,258, 4,485,719, 4,552,944, 4,567,088, 4,604,940 and 4,722,946. Additionally, elastomers prepared from isocyanate terminated prepolymers and relatively low molecular weight hydroxyl group containing compounds are also known. See, e.g., U.S. Pat. No. 4,551,498.

While the prior art compositions have properties adequate for some applications, it has heretofore not been possible to produce elastomers with relatively low hardnesses and low rebounds, and with glass transition temperatures of from $-20°$ C. to $0°$ C.

DESCRIPTION OF THE INVENTION

The present invention is directed to an elastomer which satisfies the above criteria. In addition, the systems of the present invention can generally be processed and demolded in relatively short cycle times. Finally, the elastomers of the present invention have overall good physical properties and specifically have good tear strength. More particularly, the present invention is directed to a solid polyurethane composition having a glass transition temperature of from $-20°$ C. to $0°$ C., having a Bayshore rebound of less than 20, and having a Shore A hardness of less than 80, and being prepared by reacting:

(a) a polyisocyanate having an isocyanate group functionality of 3 or more, and preferably from 3 to 4, and an isocyanate group content of from 15 to 25%, and preferably from about 19 to about 24% by weight, with (b) one or more diols having molecular weights of from 150 to about 650, wherein the isocyanate to hydroxyl equivalent ratio is from 0.95:1 to 1.2:1, and the weight ratio of component (a) to component (b) is from 5:1 to 1:1.5, and preferably from 3:1 to 1:1.5.

All of the various reactants are known in the art. The polyisocyanates useful as starting components for the production of the elastomers of the present invention may be any aliphatic, cycloaliphatic, araliphatic, aromatic or heterocyclic polyisocyanates having the requisite functionality. These include, for example, triphenylmethane-4,4',4"-triisocyanate; polyphenylpolymethylene polyisocyanates which may be obtained by aniline/formaldehyde condensation followed by phosgenation and which have been described, for example, in British Patents 874,430 and 848,671; polyisocyanates containing allophanate groups as described, e.g.: in British Patent 994,890, Belgian Patent 761,626 and published Dutch Patent Application 7,102,524; polyisocyanates containing isocyanurate groups as described, e.g. in U.S. Pat. No. 3,001,973, in German Patents 1,022,789; 1,222,067 and 1,027,394 and in German Offenlegungsschriften 1,929,034 and 2,004,048; polyisocyanates containing urethane groups as described, e.g. in Belgian Patent 752,261 or in U.S. Pat. No. 3,394,164; polyisocyanates containing acylated urea groups according to German Patent 1,230,778; polyisocyanates containing biuret groups as described, e.g. in German Patent 1,101,394 (U.S. Pat. Nos. 3,124,605 and 3,201,372) and in British Patent 889,050; reaction products of the above-mentioned isocyanates with acetals according to German Patent 1,072,385; and polyisocyanates containing polymeric fatty acid groups according to U.S. Pat. No. 3,455,883.

The distillation residues obtained from the commercial production of isocyanates which still contain isocyanate groups may also be used, optionally dissolved in one or more of the above-mentioned polyisocyanates. Mixtures of the above-mentioned polyisocyanates may also be used.

The commercially readily available polyisocyanates are generally preferred. These include, for example, polyphenylpolymethylene polyisocyanates, which may be obtained by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The hydroxyl component to be reacted with the isocyanate component to form the elastomer of the present invention consists of one or more diols having molecular weights of from 150 to about 650.

The hydroxyl compounds useful in producing the elastomer are generally known in the polyurethane art. Such compounds include, for example, polyesters, polyethers, polythioethers, polyacetals, polycarbonates and polyester amides containing 2 hydroxyl groups, such as those known for the production of polyurethanes. A key to the present invention resides in the proper selection of hydroxyl compound.

Hydroxyl group-containing polyesters used may be, for example, reaction products of dihydric alcohols and dibasic carboxylic acids. Instead of using the free carboxylic acids, the corresponding carboxylic acid anhydrides or corresponding carboxylic acid esters of lower alcohols or mixtures thereof may be used for preparing the polyesters. The carboxylic acids may be aliphatic, cycloaliphatic, aromatic and/or heterocyclic and they may be substituted, e.g. with halogen atoms, and/or be unsaturated. The following are mentioned as examples: succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, optionally mixed with monomeric fatty acids, dimethylterephthalate and terephthalic acid-bis-glycol esters. Suitable dihydric alcohols to produce such polyesters include, e.g. ethylene glycol; propylene glycol-(1,2) and -(1,3); butylene glycol-(1,4) and -(2,3); hexanediol-(1,6); octanediol-(1,8); neopentyl glycol; cyclohexane dimethanol (1,4-bis-hydroxymethylcyclohexane); 2-methyl-1,3-propanediol; diethylene glycol; triethylene glycol; tetraethylene glycol; polyethylene glycols; dipropylene glycol; polypropylene glycols; dibutylene glycol and polybutylene glycols. Polyesters of lactones, such as $\epsilon$-caprolactone, and hydroxycarboxylic acids, such as $\omega$-hydroxycaproic acid, may also be used.

The polyethers used according to the present invention contain 2 hydroxyl groups are known. They may be prepared, for example, by the polymerization of epoxides, such as ethylene oxide, propylene oxide, butylene oxide, tetrahydrofuran, styrene oxide or epichlorohydrin, either each on its own, (e.g. in the presence of BF$_3$) or by chemical addition of these epoxides, optionally as mixtures or successively, to starting components having reactive hydrogen atoms, such as water, alcohols or amines, e.g. ethylene glycol, propylene glycol-(1,3) or -(1,2), 4,4'-dihydroxydiphenylpropane, or aniline. It is frequently preferred to use polyethers which contain predominantly primary OH groups (up to 90%, by weight, based on all the OH groups present in the polyether). Polyethers which have been modified with vinyl polymers, for example the compounds obtained by the polymerization of styrene and acrylonitrile in the presence of polyethers (U.S. Pat. Nos. 3,383,351; 3,304,273; 3,523,093 and 3,110,695 and German Patent 1,152,536) are also suitable. Polybutadienes containing OH groups may also be used.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are polythio mixed ethers, polythio ether esters or polythio-ether ester amides, depending on the co-components.

Suitable polyacetals include, e.g., the compounds which may be obtained from glycols, such as diethylene glycol, triethylene glycol, 4,4'-dioxethoxy-diphenyl-dimethylmethane or hexanediol, and formaldehyde. Polyacetals suitable for the purpose of the present invention may also be prepared by polymerizing cyclic acetals.

Suitable polycarbonates containing hydroxyl groups are known and may be prepared, for example, by the reaction of diols, such as 1,3-propanediol, 1,4-butanediol and/or 1,6-hexanediol, diethylene glycol, triethylene glycol or tetraethylene glycol, with diarylcarbonates, e.g., diphenyl carbonate, or phosgene.

Suitable polyester amides and polyamides include, e.g. the predominantly linear condensates obtainable from polybasic saturated and unsaturated carboxylic acids or their anhydrides and polyvalent saturated and unsaturated amino alcohols, diamines, polyamines or mixtures thereof.

Polyhydroxyl compounds already containing urethane or urea groups as well as modified or unmodified natural polyols, such as castor oil, carbohydrates or starch may also be used. Additionally, products of alkylene oxides and phenol/formaldehyde resins or of alkylene oxides and urea/formaldehyde resins are also suitable according to the present invention.

Preferred are the polyethylene glycols, polytetramethylene glycols, polypropylene glycols, and polybutylene glycols having molecular weights within the range noted above.

Representatives of the various hydroxyl group containing compounds which may be used according to the present invention have been described, e.g. in High Polymers, Vol. XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71. The only essential requirement in selecting the particular hydroxyl compound is that the molecular weight limitations set forth above be observed. It is only in using these narrow ranges of hydroxyl compounds that the elastomers of the present invention can be obtained. In addition, the amounts of components used are essential to produce the elastomers of the present invention.

The elastomer is prepared using techniques generally known in the art. The isocyanate is mixed with component (b). The resultant mixture can then be cast into molds maintained at temperatures of from about 50° C. to about 150° C., where the final curing of the product takes place.

The invention is further illustrated by the following examples in which all parts and percentages are by weight, unless otherwise indicated.

EXAMPLES

In the examples which follow, the following materials were used:

DESN 3300: an isocyanurate group containing isocyanate having an equivalent weight of 195 and an isocyanate functionality of 3, prepared by trimerizing hexamethylene diisocyanate. The product is commercially available as Desmodur N-3300, from Mobay Corporation.

DIOL A: a polyoxypropylene glycol having a molecular weight of 1000

DIOL B: a diethylene glycol/ethylene oxide adduct having a molecular weight of 200

PMEG 250: a polytetramethylene glycol of 250 molecular weight

BD: 1,4-butane diol

EG: ethylene glycol

DEG: diethylene glycol

T-12: dibutyl tin dilaurate

GENERAL PROCEDURE

Depending on the composition of the B-side, the amounts were calculated according to the NCO content of the A-Side at an NCO/OH equivalent ratio of 1.05.

A known weight of the isocyanate was kept stirred at 32° C. in a dry metal can. A calculated amount of the hydroxyl compound(s), also at 32° C., was added to it. The mixture was stirred for 30 seconds and poured into a mold preheated to 60° C. The cast part was cured in an oven at 60° C. for 20 minutes, demolded, and post cured at ambient temperature in open air for 16 hours, before the Shore A/D hardness (ASTM D-2240) and Bayshore Rebound (ASTM D-3574-H) were checked. The glass transition temperature of the product of Example 1 as determined by Differential Scanning Calorimetry was 0.0° C.

The formulations used and the results obtained were as indicated in the following table, with Examples 2,3, and 5 through 8 being comparative examples:

| Example | DESN 3300, pbw | Hydroxyl compound, pbw | Isocyanate: Hydroxyl Ratio | Hardness Shore A, Shore D | Rebound |
|---|---|---|---|---|---|
| 1 | 75 | 44 PMEG 250 0.12 T-12 | 1.05:1 | 77A | 11 |
| 2 | 75 | 22 PMEG 250 8.2 BD | 1.05:1 | 63D | 62 |
| 3 | 75 | 17.6 PMEG 250 9.9 BD | 1.05:1 | 67D | 62 |
| 4 | 100 | 50.6 DIOL B 0.05 T-12 | 1.05:1 | 80A | 14 |
| 5 | 100 | 21.9 BD | 1.05:1 | 75D | 60 |
| 6 | 100 | 15.1 EG | 1.05:1 | 80D | 62 |
| 7 | | DIOL A | 1.05:1 | 58A | 70 |

-continued

| Example | DESN 3300, pbw | Hydroxyl compound, pbw | Isocyanate: Hydroxyl Ratio | Hardness Shore A, Shore D | Rebound |
|---|---|---|---|---|---|
| 8 | | DEG | 1.05:1 | 75D | 62 | although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solid polyurethane composition having a glass transition temperature of from $-20°$ C. to $0°$ C., having a Bayshore rebound of less than 20, and having a Shore A hardness of less than 80, and being prepared by reacting:
   (a) a polyisocyanate having an isocyanate group functionality of 3 or more, and an isocyanate group content of from 15 to 25% by weight, with
   (b) one or more diols having molecular weights of from 150 to about 650, wherein the isocyanate to hydroxyl equivalent ratio is from 0.95:1 to 1.2:1, and the weight ratio of component (a) to component (b) is from 5:1 to 1:1.5.

2. The composition of claim 1 wherein said polyisocyanate has an isocyanate group functionality of from 3 to 4 and an isocyanate group content of from 19 to 24% by weight.

3. The composition of claim 1 wherein the weight ratio of component (a) to component (b) is from 3:1 to 1:1.5.

4. The composition of claim 1 wherein said diol is selected from the group consisting of polyethylene glycols, polytetramethylene glycols, polypropylene glycols and polybutylene glycols.

* * * * *